United States Patent [19]
Jahnsen

[11] 3,950,250
[45] Apr. 13, 1976

[54] APPARATUS FOR PURIFICATION OF INDUSTRIAL WASTE WATER

[75] Inventor: Knut Waldeman Jahnsen, Oslo, Norway

[73] Assignee: Elkem-Spigerverket A/S, Oslo, Norway

[22] Filed: Jan. 24, 1973

[21] Appl. No.: 326,567

[30] Foreign Application Priority Data
Feb. 4, 1972 Norway.................................. 283/72

[52] U.S. Cl. .................... 210/208; 210/256; 259/8
[51] Int. Cl.² ......................................... B01D 21/08
[58] Field of Search ............ 210/50, 49, 51, 42, 63, 210/59, 208, 62, 219, 319, 256, 521, 84, 534; 23/267 MS; 259/5, 6, 7, 8, 48, 49

[56] References Cited
UNITED STATES PATENTS

| | | |
|---|---|---|
| 2,274,953 | 3/1942 | Downes .............................. 210/521 |
| 2,573,941 | 11/1951 | Walker et al. ....................... 210/508 |
| 2,981,682 | 4/1961 | Lancy ................................... 210/62 |
| 3,162,510 | 12/1964 | Meissner et al. ............... 23/267 MS |
| 3,174,313 | 3/1965 | Crosby et al. ........................... 259/7 |
| 3,300,047 | 1/1967 | Hirsch ................................. 210/208 |
| 3,575,854 | 4/1971 | Richards .............................. 210/50 |
| 3,615,025 | 10/1971 | Rice et al. ............................ 210/208 |
| 3,635,346 | 1/1972 | Zuckerman et al. ................. 210/208 |
| 3,753,897 | 8/1973 | Ye-Shih Lin et al. ............... 210/256 |

Primary Examiner—Charles N. Hart
Assistant Examiner—Benoit Castel
Attorney, Agent, or Firm—Eyre, Mann & Lucas

[57] ABSTRACT

An apparatus is provided for treating industrial waste water wherein suspended material and cyanides which are ordinarily dissolved in the water are treated simultaneously to reduce the time of treatment and provide a more economical and effective treatment.

3 Claims, 1 Drawing Figure

U.S. Patent  April 13, 1976  3,950,250
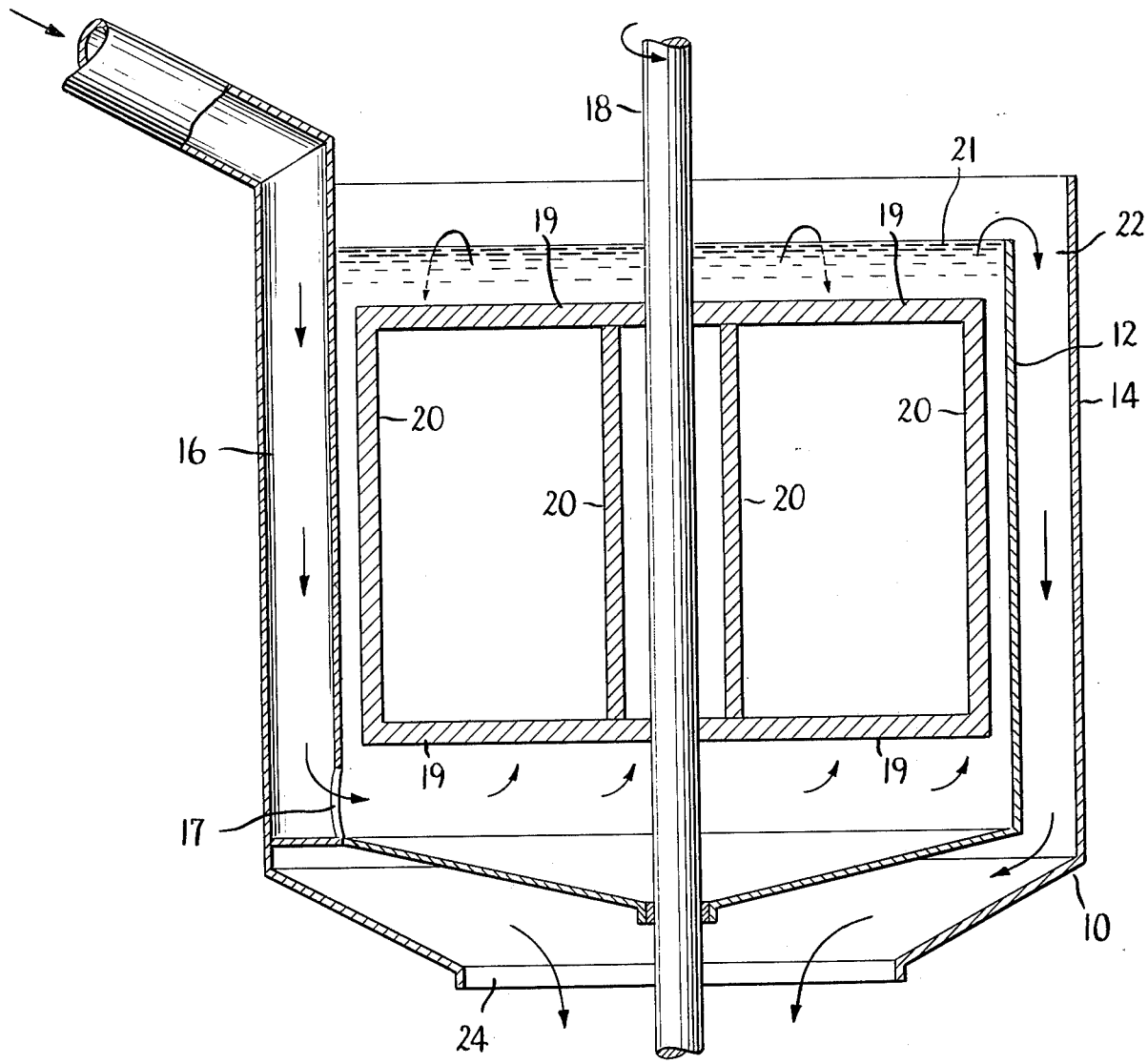

APPARATUS FOR PURIFICATION OF INDUSTRIAL WASTE WATER

The invention relates to an apparatus for purification of industrial waste water, and especially to the removal of cyanides from waste water from metallurgical and metal-working industrial plants, and also from waste water from equipment for washing of gases from electrothermic smelting furnaces etc.

The waste water from the plants mentioned above will contain suspended as well as dissolved material. Among the dissolved materials the cyanides are particularly detrimental because of their toxic nature and these must therefore be rendered harmless before the waste water can be admitted into the sea or rivers. The cyanides can either be oxidized to cyanates by means of sodium-hypochlorite or gaseous chlorine, or be decomposed by addition of sodium hypochlorite and sodium-hydroxide according to known principles. The cyanates are by far not so poisonous as the cyanides, and it will therefore in most cases be sufficient to oxidize the present cyanides to cyanates.

It can often be difficult to obtain precipitation of that material which is suspended in the waste water, and the water must therefore often be supplied with known flocculating or pH-adjusting compounds which facilitate the sedimentation. Waste water which contains dissolved cyanides is therefore usually subjected to a first process in which the cyanides are made harmless by oxidation or decomposition in a first container whereupon the water is conducted to one or more sedimentation containers in which suspended material is sedimentaded and possible dissolved metal components precipitated. When large amounts of waste water are treated, the conventional two step process requires very big containers for treatment and comparatively long retention times. It is usually calculated that it will take about 1 hour for each of the two operations. The oxidation and decomposition of cyanides requires a pH of about 11 in order to make the reaction proceed with satisfactory speed. But a pH of 10–11 is in that pH range in which the precipitation of many hydroxide components usually take place and there is the risk of precipitation in the reaction container for the cyanide oxidation. The conventional agitation in that container in which the cyanide oxidation takes place, can simultaneously affect the flocculation in such way that the yield of precipitation in the sedimentation container will be considerably reduced. If the sedimentation container is arranged ahead of the oxidation container, a reduction of precipitation in the sedimentation container can be avoided but this will in turn require a space-demanding container before and after the treatment of the cyanides.

It has now been discovered that the oxidation or decomposition of the cyanides and the mechanical flocculation can be combined in one single step. According to the present invention, the required amounts of sodium hypochlorite or gaseous chlorine for oxidation of the cyanides along with alkali for raising the pH to that level which will give optimum reaction conditions are added to the waste water in conventional amounts and manner and then the water is conducted to a combined prereaction and flocculation container in which the mechanical flocculation and oxidation of cyanides takes place simultaneously.

The pH of the waste water in the chamber for best results is usually in the range of 10 to 11. The prereaction and flocculation container is provided with an inner and an outer compartment. The waste water is fed into the inner compartment where it flows through the compartment and into the outer compartment where it flows countercurrently to the direction of flow in the first compartment. Conventional agitation means are provided in the inner compartment. The speed of agitation and retention time in the container as determined by rate of flow of the waste water are adjusted to obtain the optimum reaction conditions for the oxidation or decomposition of the cyanides and flocculation of suspended material.

The waste water to be treated is tested in conventional manner to determine the cyanide and sediment content and the effluent from the system is tested from time to time in conventional manner to determine the degree of purity of the treated water. Since the amounts and nature of the cyanides and suspended material will vary for different plants and will vary depending upon operation of a particular plant, the amounts of reagent to be added, the speed of agitation and the retention time as determined by rate of flow in the prereaction and flocculation container have to be determined empirically and adjusted from time to time for optimum reaction conditions. Since the tests employed for determining the amounts of reagents required for treatment and purity of effluent water are well known in the art, one having ordinary skill will have no difficulty in adjusting the speed of agitation and retention time in the prereaction and flocculation chamber for optimum treating conditions for the desired purity of the water for the particular plant at hand. The reagents required for treating the water may be supplied in the prereaction and flocculation container or supplied in part to the prereaction and flocculation container but best results are achieved by thoroughly mixing the reagents in the waste water before it enters the prereaction and flocculation chamber.

From the prereaction and flocculation container the water is led to a combined after-reaction and sedimentation container in which the after-reaction for the oxidation or decomposition of the cyanides and precipitation and sedimentation of respectively dissolved and suspended material take place. The simultaneous treatment of cyanides and mechanical flocculation reduce the container volume and time of treatment which results in a more economical and effective treatment. In accordance with conventional practice, one or more sedimentation containers may however be employed.

A more preferred form of apparatus for carrying out the process of the present invention is illustrated in the drawing in which:

FIG. 1 is a schematic plan view which illustrates a form of prereaction and flocculation container.

The container 10 comprises an inner compartment 12 preferably in the form of a cylinderical tank as shown and an outer compartment 14 preferably a cylinderical tank as shown to provide two concentric compartments. The waste water to be treated is fed into the inner compartment 12, as for example, by means of a channel or pipe 16 positioned in the space between the containers to feed the entering waste water into the inner container through the inlet opening 17 near the bottom of the container. It is however possible to supply the entering waste water into the inner container at any appropriate spot or if desired at a plurality of locations.

The inner container is provided with agitation means which in the drawing comprises a shaft 18 having plurality of spaced horizontal agitator blades 19 attached in fixed position to the shaft. A plurality of spaced vertical agitator blades 20 are connected at opposite ends to the spaced horizontal blades. Upon rotation of the shaft the blades impart rotative movement to the waste water as it flows up through the inner compartment and over the open mouth or outlet 21 at the top and into the space between the compartments which provides an inlet opening 22 into the outer compartment. In general, the rotational speed of the agitator is adjusted to provide optimum conditions for flocculation which is readily determined by observation of the water as it leaves the inner compartment. For this purpose it is preferred to use compartments that are open at the top but if desired the compartments may be closed with suitable doors for observation of flocculation conditions.

The waste water flows countercurrently down through the outer compartment 14 and in the preferred form of apparatus the rate of flow of waste water is materially reduced at the outlet port 24 positioned in the bottom of the outer compartment. The reduction in the rate of flow of water at the outlet may be obtained by providing an outlet port that is substantially larger than the inlet port 17. The water is conducted from the outlet port 24 to an after-reaction and sedimentation container (not shown) where for best results in rapid sedimentation the rate of flow of water should not exceed about 0.1 meters per second. The sedimentation container is of any known conventional type but the depth of the tank is very important. The deposited material is removed from the bottom of the sedimentation container in known manner while the purified water flows through an overflow channel or discharge opening for disposal. The purified water may be recycled through the gas cleaning equipment for washing the off-gases from an electrothermic smelting furnace.

In the usual process for making cyanide containing waste water harmless, one container is employed for precipitation and a second separate container is employed for destruction of the cyanides. An effective precipitation in a plant of commercial size will take from 30 minutes to 1 hour, and a complete oxidation or decomposition of the cyanides will take about one hour at optimum conditions. Altogether, the conventional process required about 2 hours. In accordance with the method of the present invention, the precipitation period is also utilized to include oxidation or destruction of the cyanides, since both these reactions take place simultaneously in the combined container. In this way the necessary container volume as well as the retention time will be reduced by 50%, to provide a more economical and effective treatment.

It will be obvious to those having ordinary skill in the art that other forms of apparatus may be employed for carrying out the process of the present invention.

It will be understood that the claims are intended to cover all changes and modifications of the preferred embodiment of the invention herein chosen for the purpose of illustration which do not constitute departure from the spirit and scope of the invention.

I claim:

1. Apparatus for the treatment of industrial waste water containing cyanides and suspended material which comprises a mechanical flocculating container in which the cyanides and one or more chemical reagents are commingled to render the cyanides harmless for deposit in public waters and in which the suspended material is commingled with a flocculating reagent and flocculated simultaneously with the commingling of said cyanides and said one or more chemical reagents, said container having an inner compartment with side and bottom walls and an outer concentric compartment with side and bottom walls, the side and bottom walls of said outer compartment being spaced away from the side and bottom walls of said inner compartment to surround the inner compartment therein and provide space between the exterior of the side and bottom walls of said inner compartment and the interior of the side and bottom walls of said outer compartment, the entire bottom wall of said inner compartment being inside the outer compartment and spaced above the bottom wall of the outer compartment, said inner compartment having an inlet opening located in the bottom end portion thereof and said inner compartment being open at the top thereof, the rim at the top end portion of the side wall of said outer compartment being located above the top of the side wall of said inner compartment and in open communication with the open top of said inner compartment, said outer compartment having an outlet opening in the bottom wall thereof in open communication with the said space between the bottom walls of said inner and outer compartments, the said space between the bottom walls of the inner and outer compartments and the said opening in the bottom wall of said outer compartment being free of obstructions to provide in combination an unobstructed exit outlet passage for the flow of treated waste water, means for feeding waste water with cyanides and suspended material through the said inlet opening into the bottom end portion of said inner compartment, said inner compartment having agitation means therein and having a solid bottom wall and solid side wall which isolates the inner compartment from the outer compartment except for the open communication between the two compartments at the top thereof, whereby all of the waste water fed into the bottom end portion of said inner compartment will flow upwardly in one direction and into the top of said outer compartment where all of the waste water and suspended material under the force of gravity will flow downwardly in a second direction in the said space between the side walls of said inner and outer compartments and in a third direction in the said space between the bottom walls of said inner and outer compartments and flow out through the outlet opening in the bottom of said outer compartment along with the flocculated material and treated cyanides which are thereby removed from said container.

2. The apparatus specified in claim 1 in which the outlet from said outer compartment is larger than the inlet opening to said inner compartment.

3. The apparatus specified in claim 1 in which the compartments are cylindrical tanks.

* * * * *